(12) United States Patent
Eckerich et al.

(10) Patent No.: US 10,267,429 B2
(45) Date of Patent: Apr. 23, 2019

(54) PLASTIC INJECTION MOLD—SVG ACTUATOR—INTERNAL SEAL UPGRADE

(71) Applicant: Magna International Inc., Aurora (CA)

(72) Inventors: Randall Hugh Eckerich, Guelph (CA); Steve Robert Moore, Puslinch (CA); Enzo Cremasco, Guelph (CA)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 15/205,457

(22) Filed: Jul. 8, 2016

(65) Prior Publication Data

US 2017/0114921 A1  Apr. 27, 2017

Related U.S. Application Data

(60) Provisional application No. 62/245,496, filed on Oct. 23, 2015.

(51) Int. Cl.

| | |
|---|---|
| *F16K 43/00* | (2006.01) |
| *F16K 31/122* | (2006.01) |
| *B29C 45/28* | (2006.01) |
| *F15B 15/14* | (2006.01) |
| *F16J 15/16* | (2006.01) |
| *F16J 15/3216* | (2016.01) |
| *F16J 15/3232* | (2016.01) |

(52) U.S. Cl.
CPC .......... *F16K 31/122* (2013.01); *B29C 45/281* (2013.01); *F15B 15/1452* (2013.01); *F15B 15/1461* (2013.01); *F16J 15/166* (2013.01); *F16J 15/3216* (2013.01); *F16J 15/3232* (2013.01); *Y10T 137/0491* (2015.04)

(58) Field of Classification Search
CPC .. F15B 15/1461; F16J 15/166; F16J 15/3216; F16J 15/3232; B29C 45/281; F16K 31/122
USPC ........... 277/654, 488, 582; 137/15.08, 15.17, 137/15.18
See application file for complete search history.

(56) References Cited

U.S. PATENT DOCUMENTS 2,446,224 A * 8/1948 Frisby ........................ F16J 9/00
                                                    277/458
3,057,630 A * 10/1962 Sneed .................. F16J 15/3208
                                                    277/436

(Continued)

*Primary Examiner* — Umashankar Venkatesan
(74) *Attorney, Agent, or Firm* — Warn Partners, P.C.

(57) ABSTRACT

An improved life hydraulic valve actuator for a mold used in an injection molding machine. The actuator includes a housing for insertion into a hot runner assembly having a movable valve gate pin. A bore in the housing for receives an actuation piston which is connected to the gate pin. A hydraulic chamber in the assembly lifts the piston upward and downward for actuation of the pin in a valve gate. The actuation piston includes a centrally located circumferential double lip seal. The wall of the bore includes a pair of circumferential seals for engaging the outer circumference of the piston. The seals are positioned axially on either side of said centrally located double lip seal of the piston for sealing and guiding the piston. The circumferential bore seals include a Teflon ring which protects the bore in the event of seal failure and a second seal made of a Viton material. The seals in combination increase the longevity of the actuator over three fold than a similar actuation valve.

16 Claims, 11 Drawing Sheets

(56) References Cited

U.S. PATENT DOCUMENTS

| | | | | |
|---|---|---|---|---|
| 3,171,334 A * | 3/1965 | Rasmussen | ........... | F15B 15/149 |
| | | | | 277/346 |
| 4,262,915 A * | 4/1981 | Williams | ............... | F16J 15/166 |
| | | | | 277/560 |
| 4,702,482 A * | 10/1987 | Oseman | ............... | F16J 15/3208 |
| | | | | 277/556 |
| 4,709,932 A * | 12/1987 | Edlund | ............... | F16J 15/3204 |
| | | | | 277/550 |
| 5,113,747 A * | 5/1992 | Pignerol | ............. | F16J 15/3208 |
| | | | | 277/467 |
| 5,894,025 A | 4/1999 | Lee et al. | | |
| 6,419,870 B1 | 7/2002 | Lee et al. | | |
| 6,568,313 B2 * | 5/2003 | Fukui | .................. | F15B 15/1452 |
| | | | | 92/168 |
| 6,599,116 B2 | 7/2003 | Lee et al. | | |
| 7,111,823 B2 * | 9/2006 | Hansen | ................. | F15B 15/065 |
| | | | | 137/15.17 |
| 8,561,999 B2 * | 10/2013 | Maeda | ................ | F16J 15/3208 |
| | | | | 277/459 |

* cited by examiner

PLASTIC INJECTION MOLD—SVG ACTUATOR—INTERNAL SEAL UPGRADE

CROSS REFERENCE TO RELATED APPLICATIONS

This application claims the benefit of U.S. Provisional Application No. 62/245,496, filed Oct. 23, 2015. The disclosure of the above application is incorporated herein by reference.

FIELD OF THE INVENTION

The present invention relates to a hydraulic valve gate actuator for a mold of an injection molding machine. More particularly the present invention relates to extending the life of a hydraulic valve gate actuator.

BACKGROUND OF THE INVENTION

Injection molding machines are common in manufacture today. In these machines molten plastic is forced through a valve gate into a mold for creating a solidified polymer part.

Typically injection molding machines include an injection screw which forces heated polymer material through a hot runner assembly into a mold for creating a final molded part. The hot runner assembly includes one or more drop tubes which are attached to gates in the mold and movable pins are used for opening and closing of the valve gates during the injection cycle. The pin is lifted up and down by some sort of actuator, with hydraulic piston type actuator being the most commonly used.

These actuators are designed to lift the pin from the gate seat for beginning injection and thereafter dropping the pin back into the gate when the injection of plastic at a particular site is complete. In most molds used today multiple gates are used in a mold to produce the best results with sequencing of the actuators and gates being common.

Because of the use of multiple gates, failure or wearing of even one of the actuators can ruin the molding of an entire part. This is particularly a problem during high volume runs of parts where the longevity of these components is taken to the limits of their life. If a part molding program must be shut down because of a faulty valve gate actuator the entire hot runner assembly must be disassembled for replacement resulting in expensive and time consuming shut down and repair time. Not to mention the possibility of imperfect parts before the problem was noticed and corrected.

For instance, it has been found that after 30,000-50,000 shots conventional sequential valve gate actuators are prone to leakage & sluggishness due to internal seal failures when supplied with standard issue seals. Some failures can become severe enough to destroy the cylinder housing from scouring.

Sluggishness in pin movements creates part defects that are difficult to determine the root cause of. However, it is believed in many cases that these defects and part failures are due to poor reaction time of the actuators which make the SVG pin move erratically.

Therefore, there remains a need in the art to provide a longer lasting hydraulic valve gate actuator which will withstand high quantity production runs such as are found in the automotive industry.

SUMMARY OF THE INVENTION

In accordance with the present invention there is provided an improved life hydraulic valve gate actuator for a mold used in a injection molding. The actuator included a housing for insertion into a hot runner assembly having a movable valve gate pin. A bore in the housing receives an actuation piston which is connected to the gate pin. A hydraulic chamber in the assembly lifts the piston upward and downward for actuation of the pin in a valve gate. The actuation piston includes a centrally located circumferential double lip seal. The wall of the bore includes a pair of circumferential seals for engaging the outer circumference of the piston. The seals are positioned axially on either side of said centrally located double lip seal of the piston for sealing and guiding the piston. The circumferential bore seals include a Teflon® ring which protects the bore in the event of seal failure and a second seal made of a Viton® material. The seals in combination increase the longevity of the actuator over three fold than a similar actuation valve.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
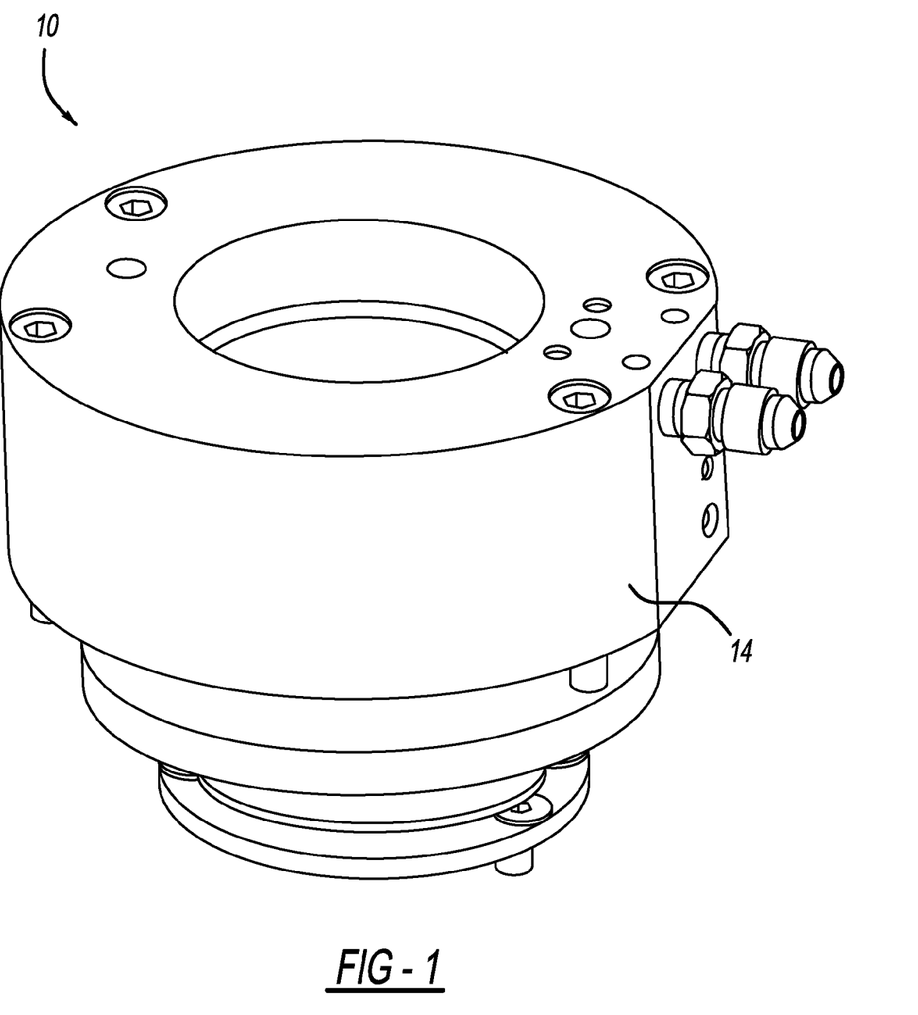
FIG. 1 is a perspective view of a hydraulic actuator for a sequential valve gate.
Figure 2:
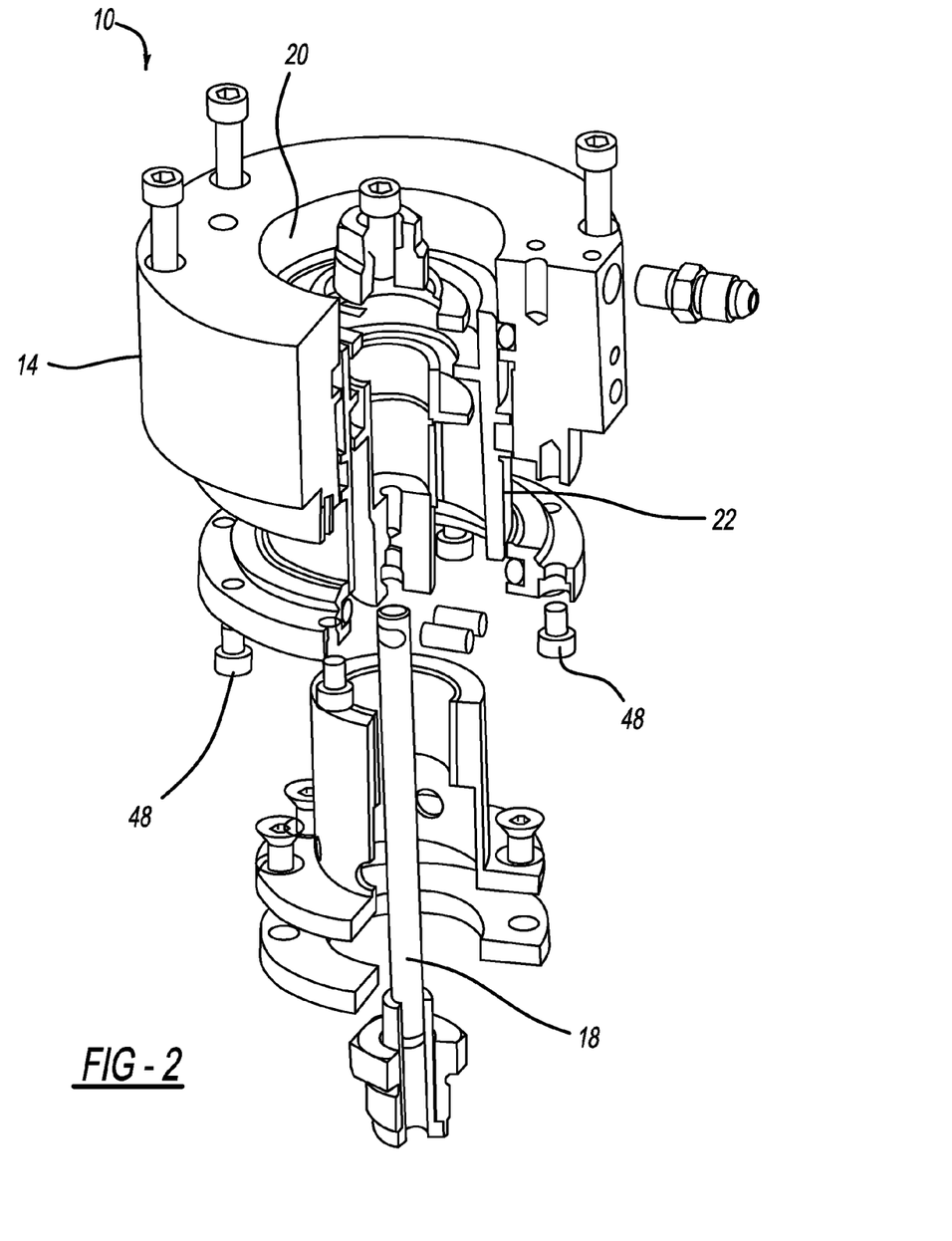
FIG. 2 is an exploded view of the actuator of FIG. 1.
Figure 3:
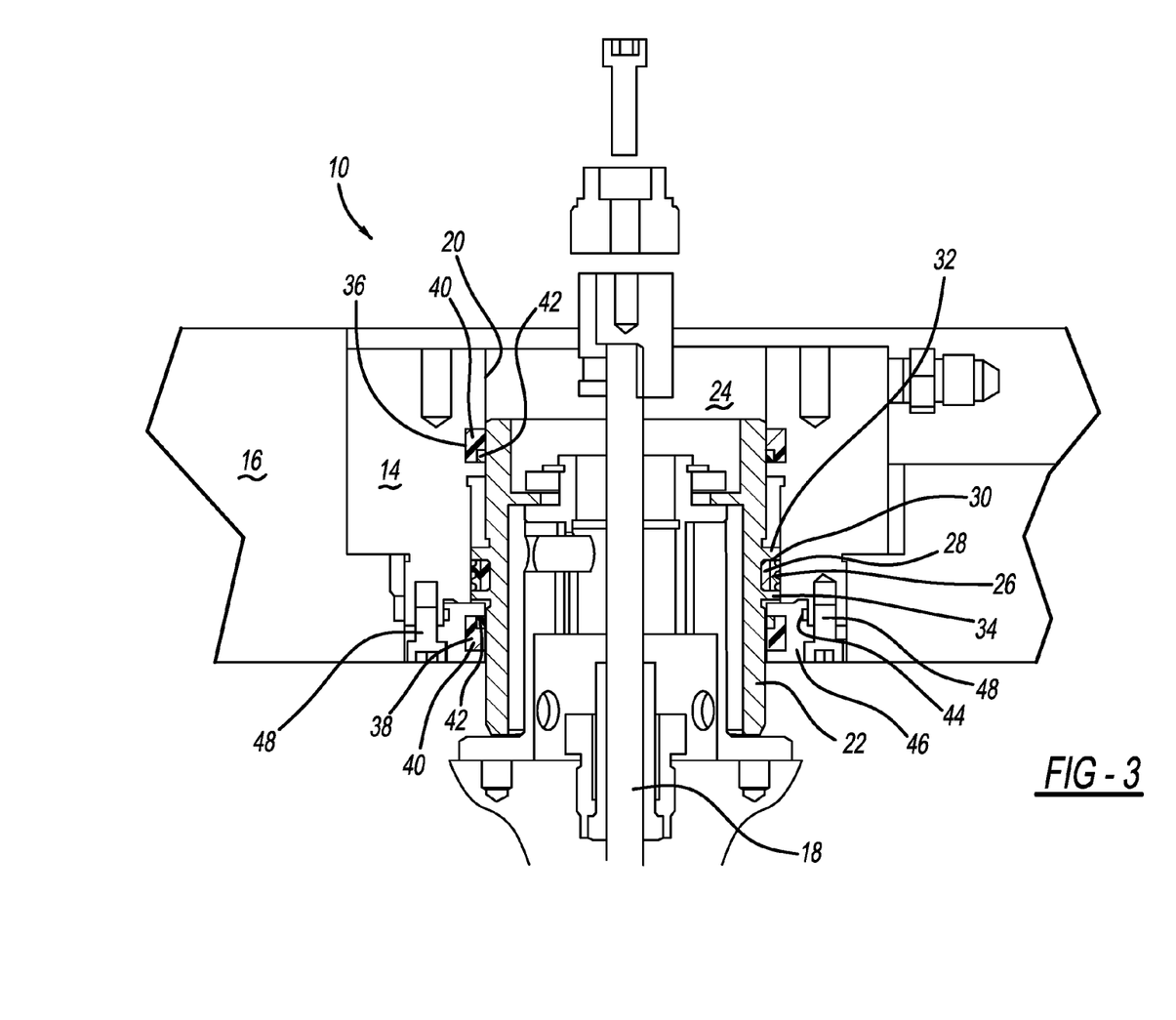
FIG. 3 is a sectional view of the actuator of FIG. 1.

In accordance with the present invention there is provided, a hydraulic valve gate actuator (generally shown at 10 in FIG. 1) which provides improved life when used in a high volume production environment in a sequential valve gate for a mold used in an injection molding machine, such as an automotive injection molding production line.

Figure 4:
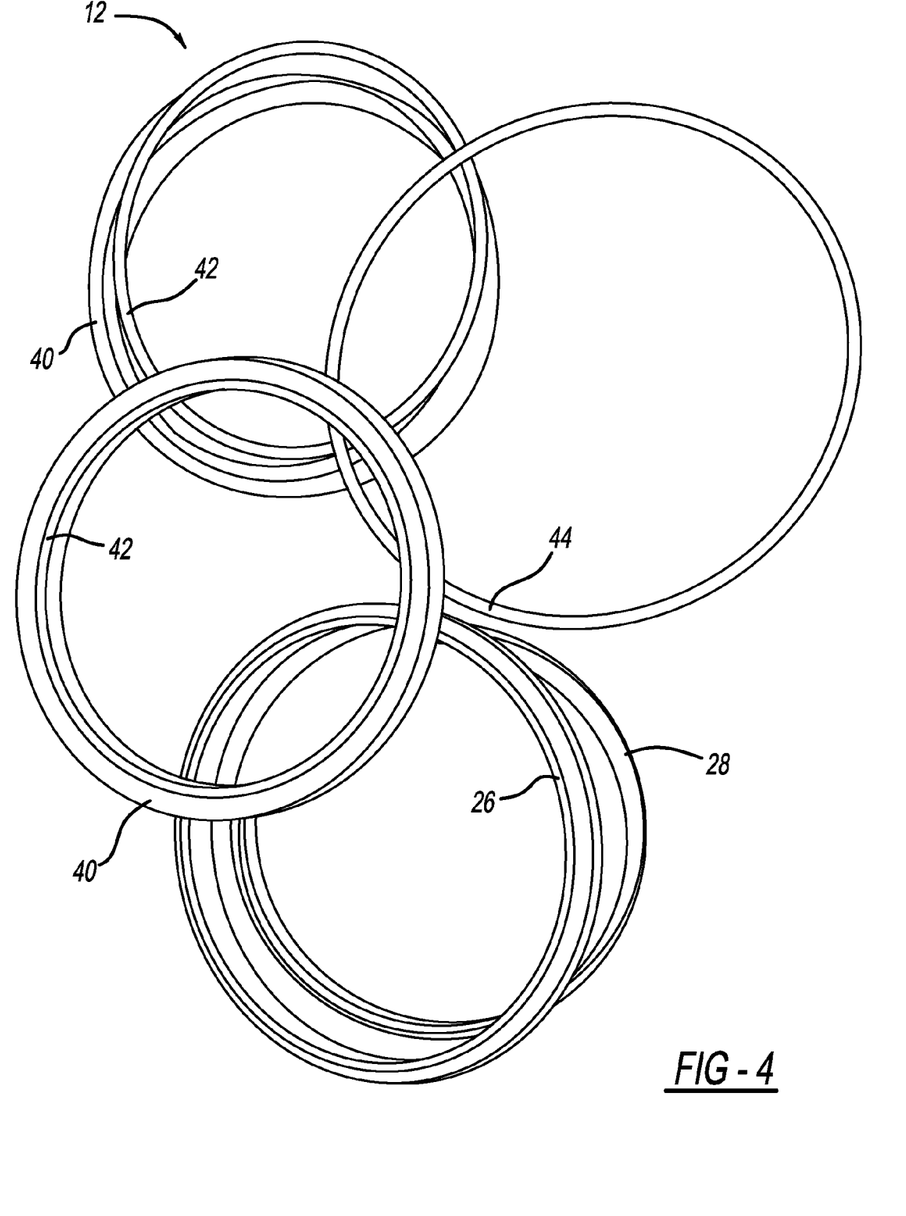
FIG. 4 is a perspective view of a valve seal replacement of the seals in the actuator of FIG. 1 in accordance with the teachings of the present invention.
Figure 5:
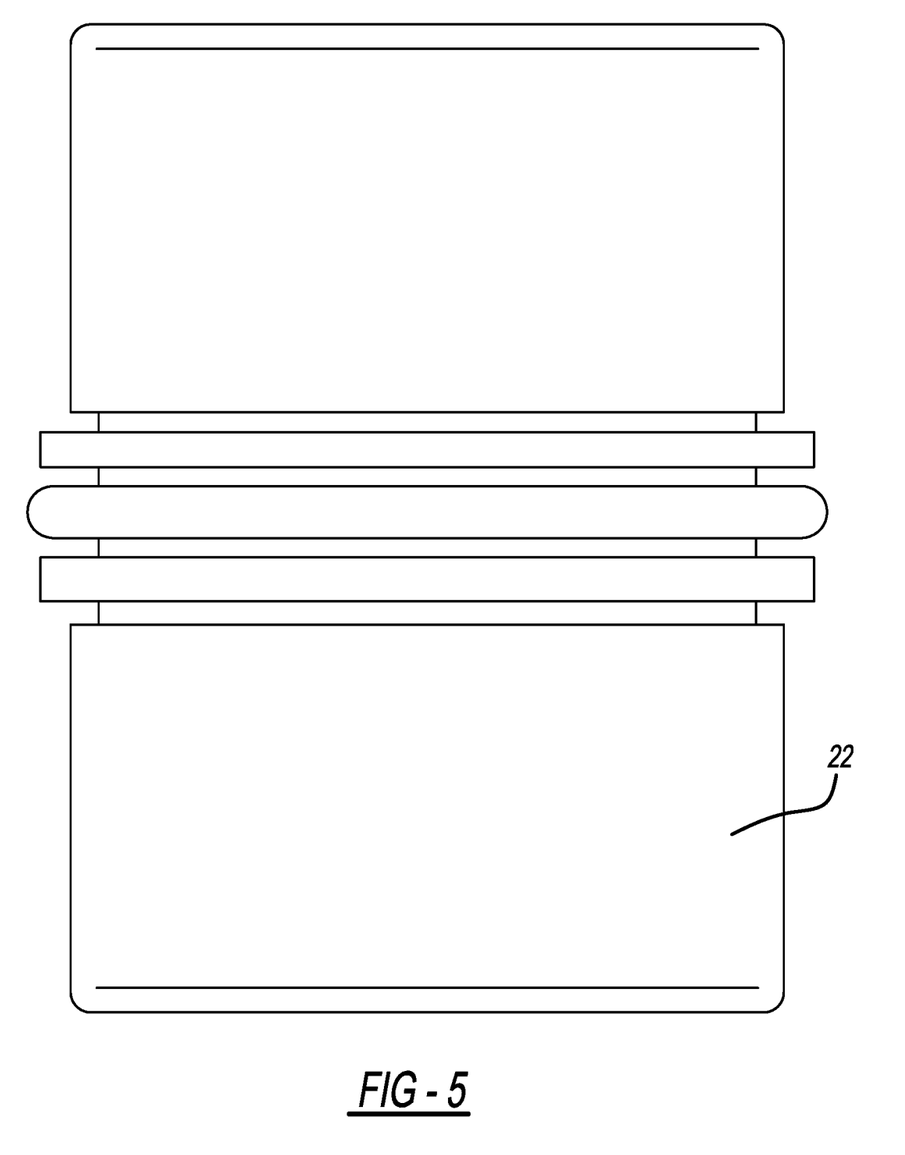
FIG. 5 is a plan view of the piston of the actuator of FIG. 1 showing a prior art 'O' ring seal.
Figure 6:
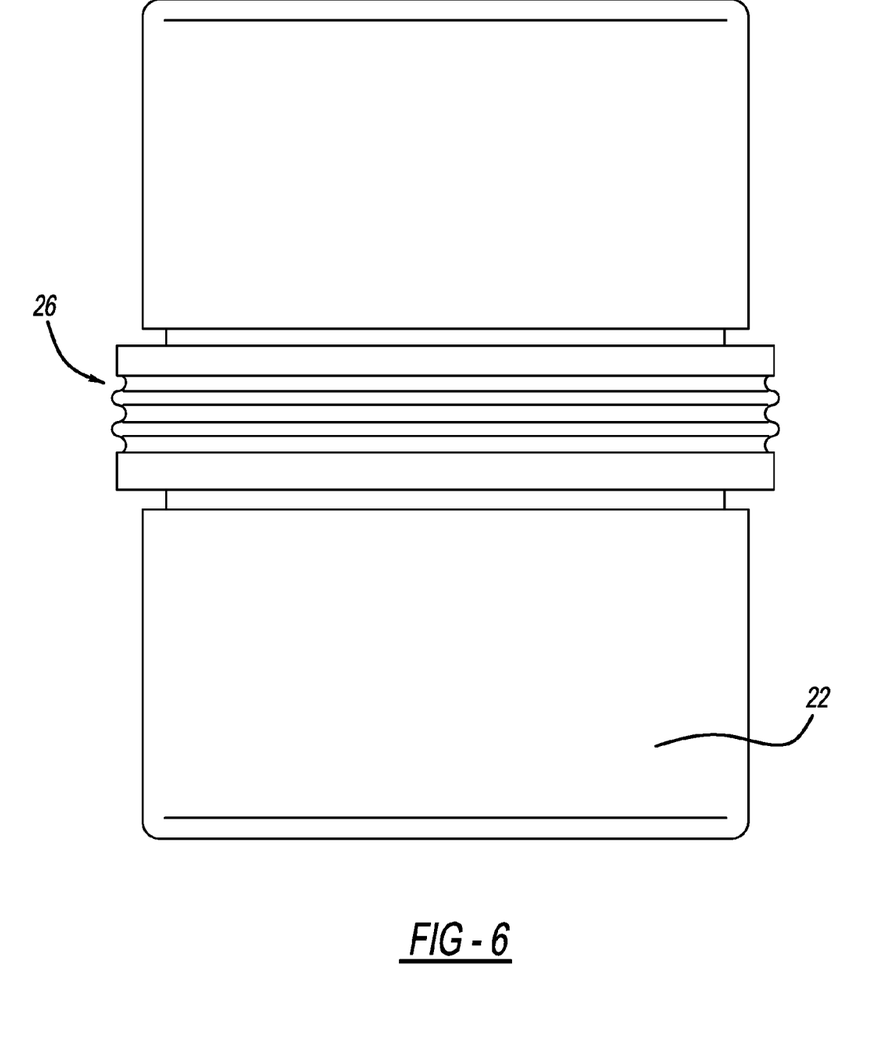
FIG. 6 is a plan view of a the piston of FIG. 5 using the piston ring seal of the present invention.
Figure 7:
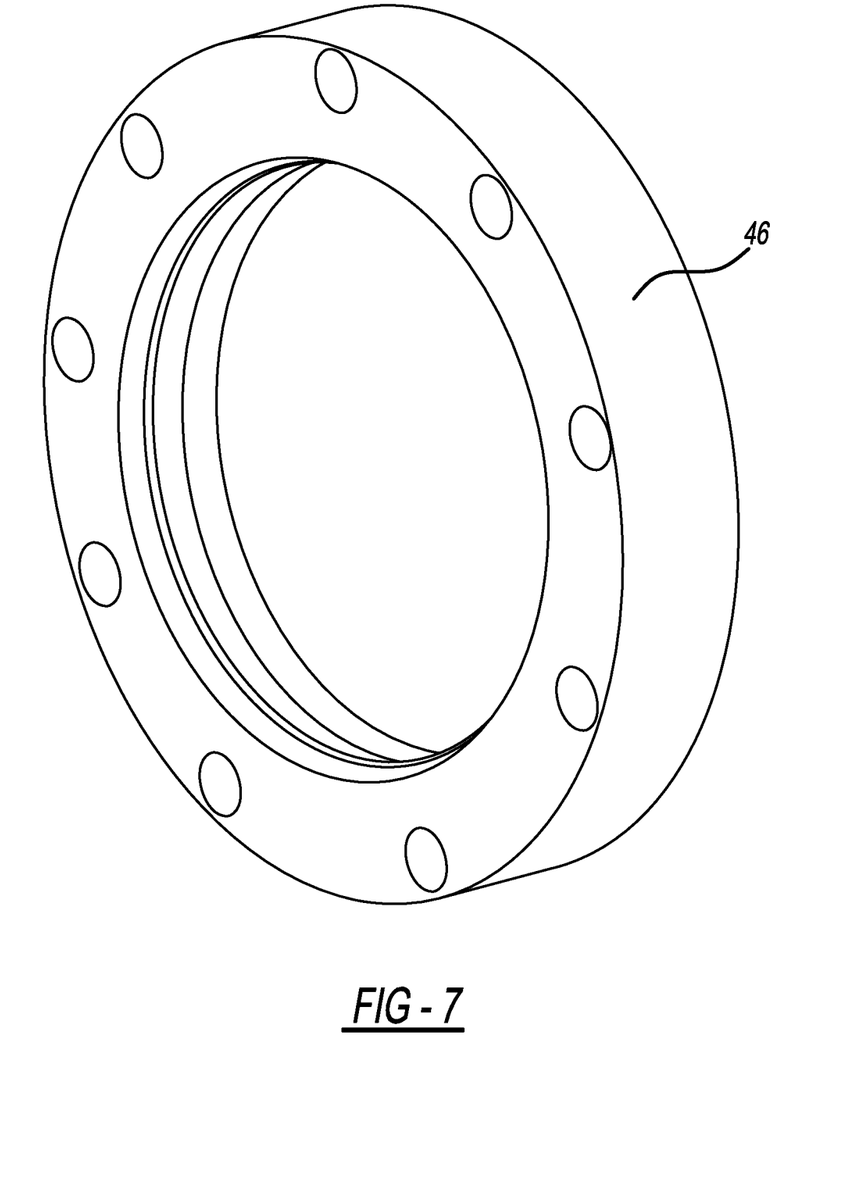
FIG. 7 is a view of the a prior art bore seal used in a valve actuator of FIG. 1.
Figure 8:
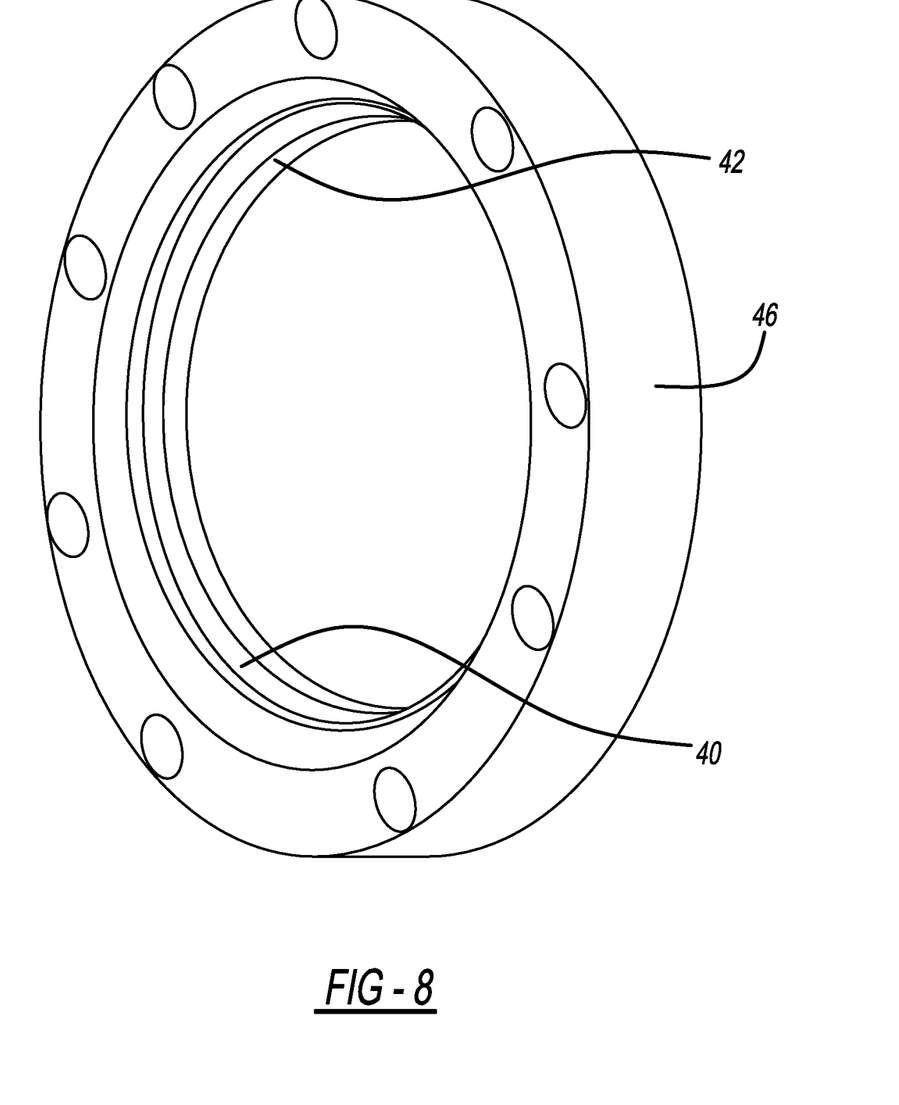
FIG. 8 is a bore seal in accordance with the seal of the present invention.
Figure 9:
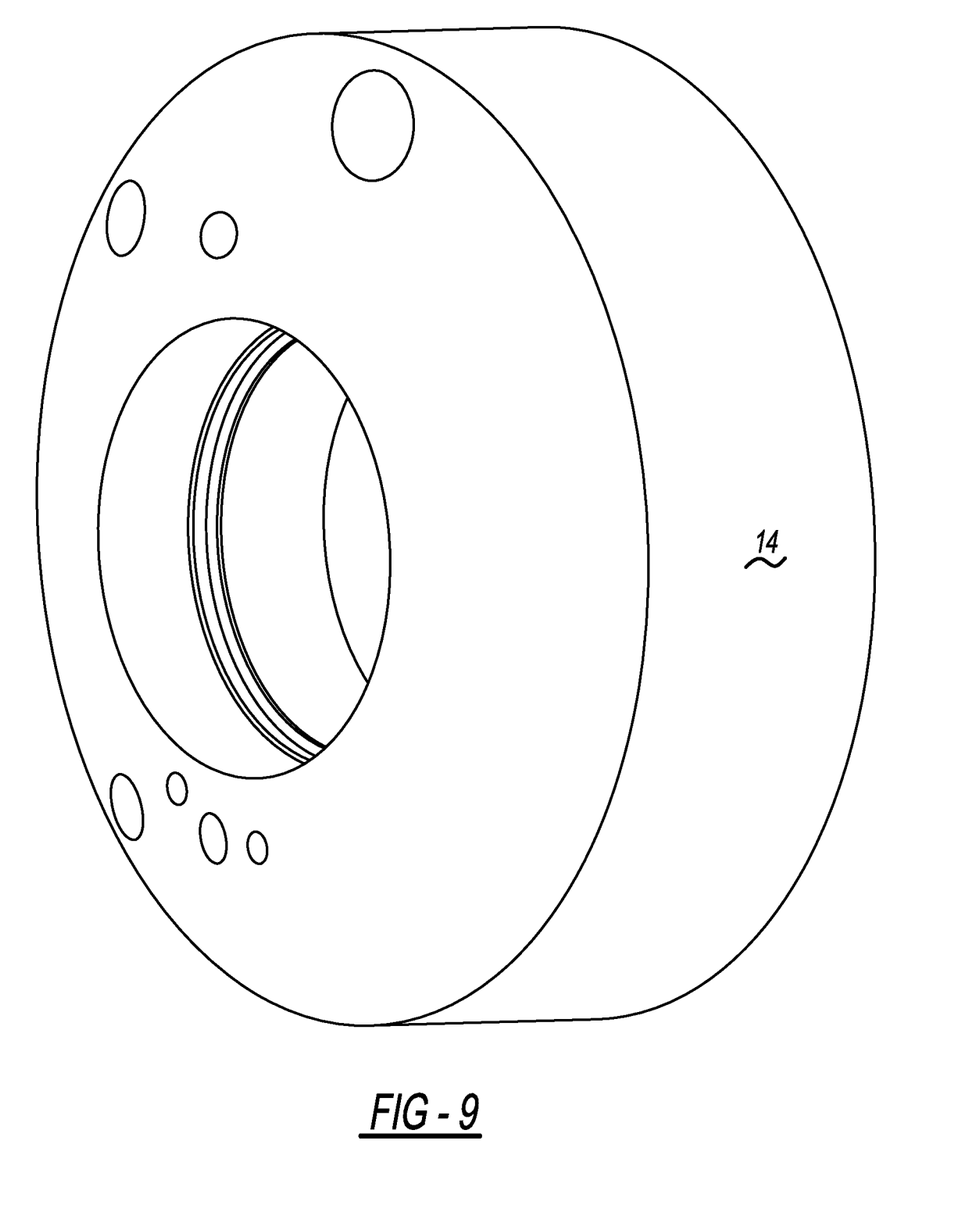
FIG. 9 is a main housing lip and backing seal used in the prior art.
Figure 10:
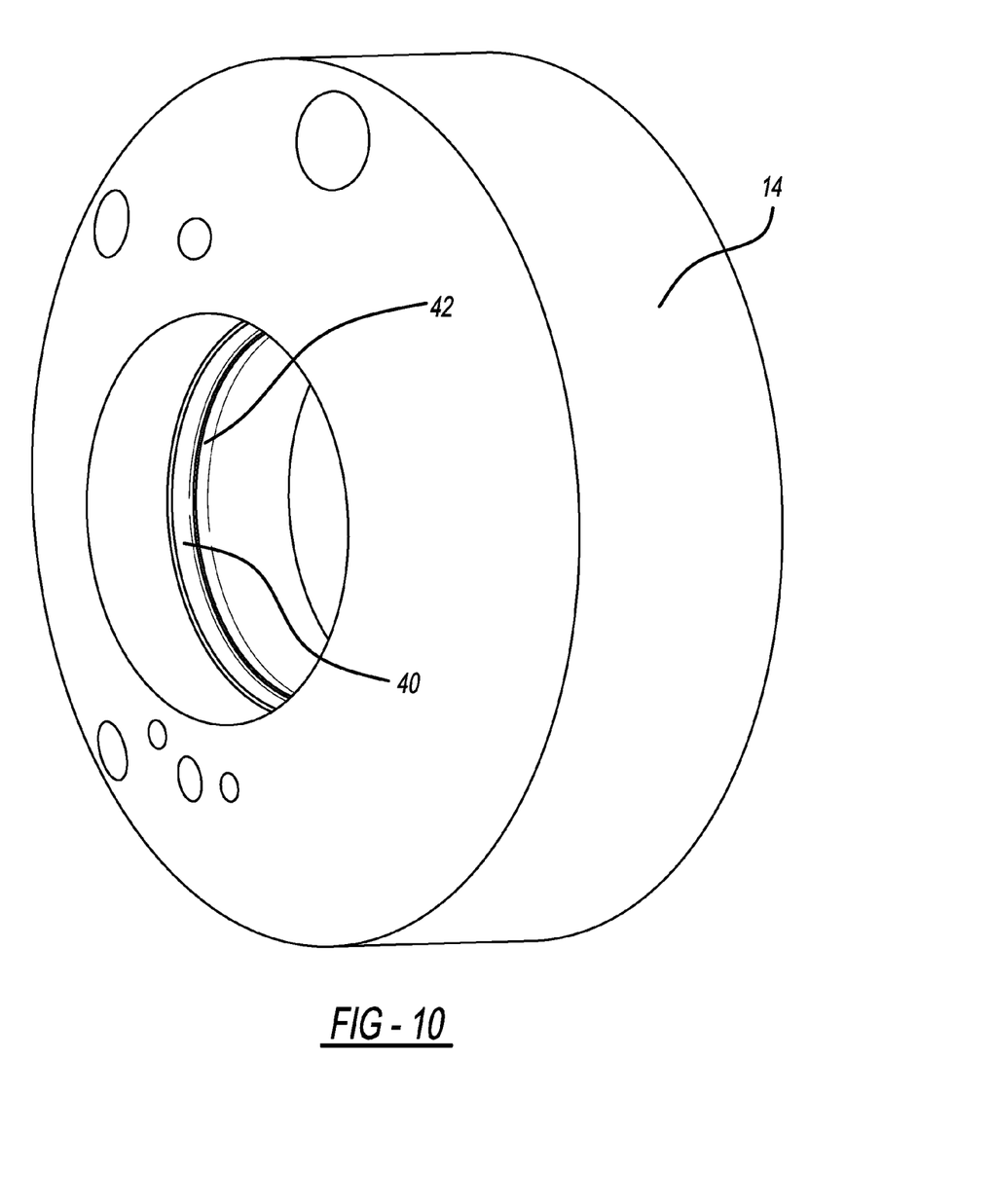
FIG. 10 is a main housing seal used in the present invention to replace the seal of FIG. 9; and, FIG. 11 is a detailed sectional view of the seals and seal kit of the present invention.

Generally, the valve includes a kit of replacement seal parts (generally show in at 12 in FIG. 4). The actuator 10 includes a housing 14 for insertion into a hot runner assembly tool back plate 16 having a movable valve gate pin 18. Bore 20 in the housing receives an actuation piston 22 which is connected to the gate pin 18 for moving the pin up and down in the bore 20.

A hydraulic chamber 24 in the assembly lifts the piston 22 upward and downward for actuation of the pin 18 for opening and closing a valve gate in an injection mold.

Figure 11:
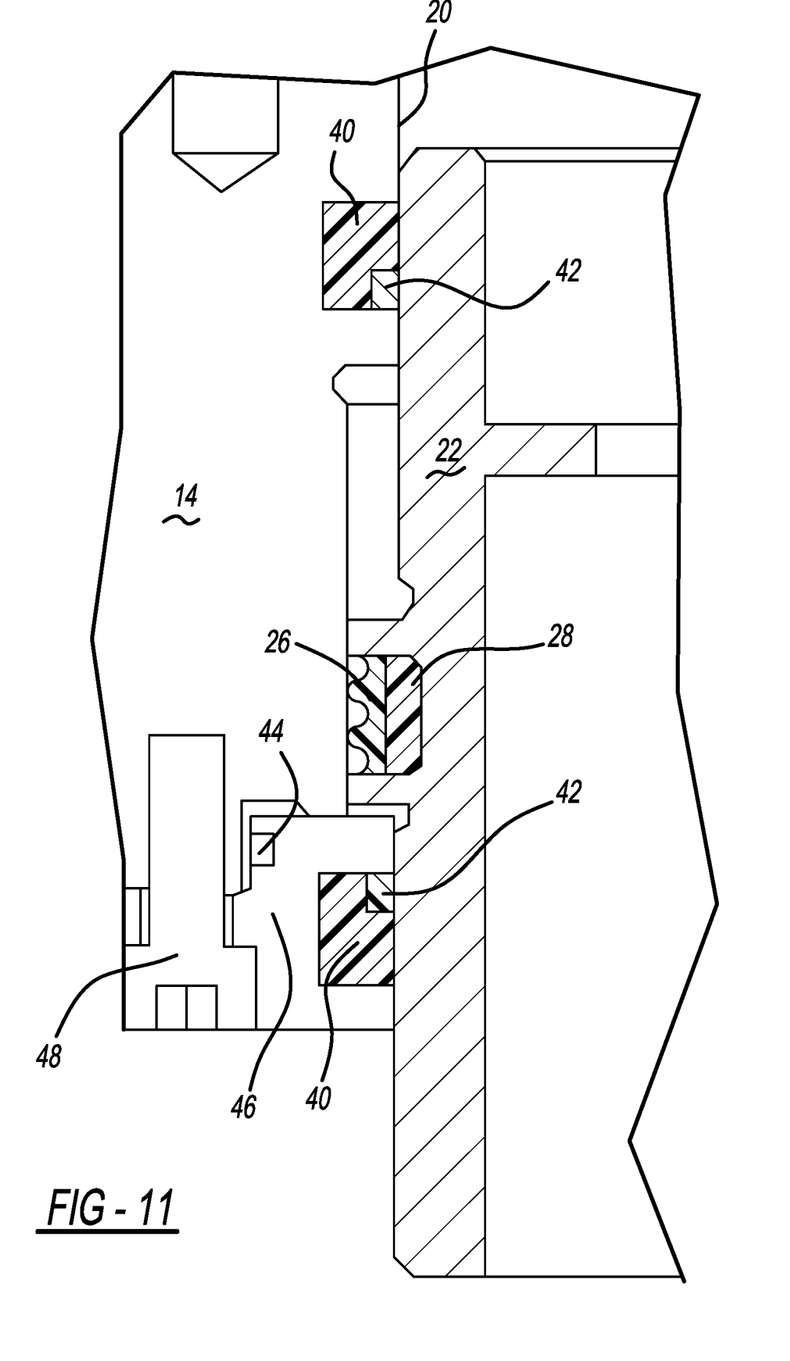

The actuation piston 22 includes a centrally located circumferential double lip seal 26 which is preferably In a preferred embodiment, the double lip seal 26 is a Hytrel material (Polyester resin family) with a Shore A hardness of from generally about 90.25 to about 99.75 preferably about 95. A backing seal 28 placed underneath seal 26 in a circumferential slot 30 formed by two radially extending walls 32 and 34 in the piston 22. Backing seal 28 assures that the seal 26 is held securely in the slot 30 and has a Shore A hardness of generally from about 66.5 to about 73.5 preferably about 70. The wall of the bore 20 includes a pair of circumferential seals 36 and 38 for engaging the outer circumference of the piston 22. The seals 36 and 38 are positioned in the housing axially on either side of the centrally located double lip seal 26 of the piston 22 for sealing and guiding the piston 22. The circumferential bore seals 36 and 38 are both the same type of two part seal. As shown best in FIGS. 4 and 11 seals 36 and 38 each include an inner Teflon® fluoropolymer ring 42 which protects the bore in the event of seal failure and a second lip seal 40 made of a Viton® fluoroelastomer (both materials are available from Du Pont). Seal 40 of the present invention has a Shore A hardness of generally from about 76 to about 84, and preferably about 85. The Teflon® ring 42 has a Shore D hardness of generally from about 52.25 to about 57.25 and preferably about 55. In an alternate embodiment there is a step in the ring 40 which forms an axial lip and the Teflon® seal nests in the space formed next to the lip.

Seal 44 is made of a nitrile material having a shore A hardness of generally from about 66.5 to about 73.5, preferably about 70 is used for sealing of the lower removable seal plate 46. Seal plate 46 is held to the actuator housing 14 by way of threaded fasteners 48.

In operation the seal 26 has a better wipe seal than the basic 'O' ring used in the prior art additionally seal 26 and the backing seal 28 take up all the space in the slot 30, which prevents the seal 26 from rolling in the slot. This increases the longevity of this seal arrangement since it is believed that the prior art rolling of the 'O' ring in the slot would lead to 'O' ring seal breakage and resulting failure of the actuator. Additionally, the use of the inner Teflon® ring seal 42 is robust enough to prevent metal on metal contact and deterioration in the event of other seal failures which also increases the longevity of the actuator. The seals when installed in the kit of parts as taught in the present invention, in combination, increase the longevity of the actuator over three fold over a similar actuation valve using conventional seals as shown in the drawings.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A hydraulic valve gate actuator for a mold used in an injection molding machine comprising:
   a housing adapted for insertion into a hot runner assembly having a movable valve gate pin;
   a bore in said housing for receiving of an actuation piston the actuation piston being connected to said gate pin;
   said actuation piston including a centrally located double lip seal; and
   said bore including a pair of circumferential seals for engaging the outer circumference of the piston and positioned axially on either side of said centrally located double lip seal, said circumferential seals including a Teflon flouropolymer ring having a Shore D hardness of from about 52.25 to about 57.25 which protects the bore in the event of seal failure and a second seal made of a Viton fluoroelastomer material having a Shore A hardness of from about 76 to about 85; and
   wherein the Teflon ring has an outer circumference so that it fits inside an inside diameter of said second seal.

2. The hydraulic valve gate actuator of claim 1 wherein said second seal is a lip seal.

3. The hydraulic valve gate actuator of claim 1 wherein the Teflon ring has an outer circumference so that it fits inside the inside diameter of said second seal.

4. The hydraulic valve gate actuator of claim 1 further comprising a second seal concentrically spaced but within a groove occupied by the double lip seal.

5. The hydraulic valve gate actuator of claim 4 wherein the groove is formed by a pair of circumferential walls formed around the outer periphery of the piston.

6. The hydraulic valve gate actuator of claim 1 wherein the inner diameter of the circumferential seals is from 4% to 6% smaller than the outside diameter of the actuation piston.

7. The hydraulic valve gate actuator of claim 1 wherein the inner diameter of the circumferential seals is from 5% smaller than the outside diameter of the actuation piston.

8. The hydraulic valve gate actuator of claim 1 wherein the double lipped seal has a shore A hardness of from about 90.25 to about 99.75.

9. A seal kit of parts for use in replacement of seals in a hydraulic valve gate actuator for an injection molding machine comprising:
   a double lipped piston seal, two pairs of wall seals each including an inner Teflon seal and an outer elastomeric seal;
   a housing adapted for insertion into a hot runner assembly having a movable valve gate pin; a bore in said housing for receiving of an actuation piston the actuation piston being connected to said gate pin; said actuation piston including a centrally located slot for receiving the double lipped piston seal;
   the bore in said housing including surfaces forming a pair of axial spaced slots for receiving the pair of circumferential seals which engage the outer circumference of the piston and wherein the seals are positioned axially on either side of said centrally located double lip seal, said circumferential seals including a first Teflon fluoropolymer ring having a Shore D hardness of from about 52.25 to about 57.25 which protects the bore in the event of seal failure and a second seal made of a Viton fluoroelastomer material having a Shore A hardness of from about 76 to about 85; and
   wherein the Teflon ring has an outer circumference so that it fits inside an inside diameter of said second seal.

10. The seal kit of parts for use in replacement of seals in a hydraulic valve gate actuator for an injection molding machine of claim 9 further comprising an axially spaced circumferential seal for axial placement in a piston groove.

11. The seal kit of parts for use in replacement of seals in a hydraulic valve gate actuator for an injection molding machine of claim 9 further comprising a second seal axially spaced but within the same a groove occupied by the double lipped piston seal.

12. The seal kit of parts for use in replacement of seals in a hydraulic valve gate actuator for an injection molding machine of claim 9 wherein the slot is formed by a pair of circumferential walls formed around the outer periphery of the piston.

13. The seal kit of parts for use in replacement of seals in a hydraulic valve gate actuator for an injection molding machine of claim 9 wherein the inner diameter of the circumferential seals is from 4% to 6% smaller than the outside diameter of the actuation piston.

14. The seal kit of parts for use in replacement of seals in a hydraulic valve gate actuator for an injection molding machine of claim 9 wherein the inner diameter of the circumferential seals is 5% smaller than the outside diameter of the actuation piston.

15. The seal kit of parts for use in replacement of seals in a hydraulic valve gate actuator for an injection molding machine of claim 9 wherein the double lipped seal has a shore A hardness of from about 90.25 to about 99.75.

16. A process for enhancing the life cycle characteristics of a hydraulic valve gate actuator for a mold used in an injection molding machine comprising the steps of:

providing a housing adapted or insertion into a hot runner assembly having a movable valve gate pin with a bore in said housing for receiving of an actuation piston the actuation piston being connected to said gate pin; and replacing the seals in the actuator with replacement seals including a centrally located double lip seal; and said bore including a pair of circumferential seals for engaging the outer circumference of the piston and positioned axially on either side of said centrally located double lip seal, said circumferential seals including a Teflon fluoropolymer ring having a Shore D hardness of from about 52.25 to about 57.25 which protects the bore in the event of seal failure and a concentric second seal made of a Viton fluoroelastomer material having a Shore A hardness of from about 76 to about 85; and wherein the Teflon ring has an outer circumference so that it fits inside an inside diameter of said second seal.

* * * * *